US006440344B2

(12) United States Patent
Goto et al.

(10) Patent No.: US 6,440,344 B2
(45) **Date of Patent: *Aug. 27, 2002**

(54) METHOD OF MANUFACTURING COMPOSITE INSULATOR AND PACKING MEMBER FOR USE IN SAME

(75) Inventors: Daisaku Goto; Hiroshi Kashiwagi; Takao Tani, all of Nagoya (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,559

(22) PCT Filed: Mar. 10, 1998

(86) PCT No.: PCT/JP98/00987

§ 371 (c)(1), (2), (4) Date: Feb. 5, 1999

(87) PCT Pub. No.: WO98/40896

PCT Pub. Date: Sep. 17, 1998

(30) Foreign Application Priority Data

Mar. 11, 1997 (JP) ............................................ 9-056297

(51) Int. Cl.$^{7}$ .......................... B29C 43/18; B29C 45/14

(52) U.S. Cl. ....................... 264/135; 264/254; 264/261; 264/263; 264/272.15; 264/275

(58) Field of Search ................................ 264/135, 254, 264/261, 263, 259, 278, 271.1, 328.16, 265, 274, 272.15, 320, 275; 425/116

(56) References Cited

U.S. PATENT DOCUMENTS

| | | | | | |
|---|---|---|---|---|---|
| 3,703,606 | A | * | 11/1972 | Willem | |
| 4,654,478 | A | * | 3/1987 | Ishihara et al. | |
| 4,885,039 | A | * | 12/1989 | Thevenet | 156/294 |
| 5,753,272 | A | * | 5/1998 | Kashiwagi | 264/274 |
| 5,804,122 | A | * | 9/1998 | Ishino | 264/261 |
| 5,811,049 | A | * | 9/1998 | Kashiwagi | 264/263 |
| 5,914,462 | A | * | 6/1999 | Fujii | |
| 6,019,931 | A | * | 2/2000 | Kashiwagi | 264/271.1 |
| 6,118,079 | A | * | 9/2000 | Koshino et al. | |
| 6,189,387 | B1 | * | 2/2001 | Tani et al. | |

FOREIGN PATENT DOCUMENTS

| | | | |
|---|---|---|---|
| JP | 61-203513 | | 9/1986 |
| JP | 2-191691 | * | 7/1990 |
| JP | 6-283060 | | 10/1994 |
| JP | 7-65657 | | 3/1995 |
| JP | 7-272558 | | 10/1995 |
| JP | 8-185749 | * | 7/1996 |

* cited by examiner

*Primary Examiner*—Mathieu D. Vargot
(74) *Attorney, Agent, or Firm*—Burr & Brown

(57) ABSTRACT

In a method of producing a composite insulator having a core member, end fitting members fixed to both end portions of the core member, and an overcoat member including a sheath portion formed on an outer surface of the core member and shed members, the overcoat member and the end fitting member are connected by curing. Moreover, a clamping operation is performed or a packing member is used for preventing a flow of an overcoat forming material into a seal portion. In this manner, it is possible to improve a seal performance of a connection boundary between the end fitting member and the overcoat member.

22 Claims, 12 Drawing Sheets

METHOD OF MANUFACTURING COMPOSITE INSULATOR AND PACKING MEMBER FOR USE IN SAME

TECHNICAL FIELD

The present invention relates to a method of producing a composite insulator comprising a core member made of for example FRP, end fitting members fixed to both end portions of the core member, and an overcoat member made of insulation material having a sheath portion formed on an outer surface of the core member and shed portions, and also relates to a packing member used for this composite insulator producing method which is arranged for preventing a flow of an overcoat forming material into a gap between the core member and the end fitting member fixed to both end portions of the core member.

BACKGROUND ART

Up to the present, the composite insulator comprising the core member, the end fitting members fixed to both end portions of the core member, and the overcoat member having the sheath portion formed on the core member and the shed portions is produced by various methods for example by arranging the end fitting members on both end portions of the core member, setting the core member and the end fitting members in a metal mold, filling the overcoat forming material in the metal mold, and curing the overcoat forming material. Moreover, in order to improve a seal performance between the end fitting member and the overcoat forming material, there is known a technique such that an overcoat forming material of room temperature hardening type (RTV) is used as the overcoat forming material, and also there is known a technique such that a material such as silicone gel is arranged between the end fitting member and the overcoat forming material.

Even in the method using the RTV or the method using silicone gel mentioned above, it is possible to maintain a normal seal performance, but recently more excellent seal performance is to be required. Therefore, particularly in the case of the composite insulator in which the overcoat member is made of an insulation material such as silicone rubber, there is a desire to obtain a method of producing a composite insulator in which a seal performance of a connection boundary between the end fitting member and the overcoat forming material can be maintained and an end portion of the core member can be firmly connected to an inner surface of a core member insertion hole of the end fitting member.

DISCLOSURE OF THE INVENTION

An object of the invention is to eliminate the drawbacks mentioned above and to provide a method of producing a composite insulator in which a seal performance of a connection boundary between a end fitting member and an overcoat member can be improved and a packing member used for this producing method.

According to the invention, a method of producing a composite insulator having a core member, end fitting members fixed to both end portions of the core member, and an overcoat member including a sheath portion formed on an outer surface of the core member and shed members, is characterized in that the overcoat member and the end fitting member are connected by curing.

According to the invention, a packing member used for the method of producing a composite insulator having a core member, end fitting members fixed to both end portions of the core member, and an overcoat member including a sheath portion formed on an outer surface of the core member and shed members, and arranged for preventing a flow of the overcoat forming material into a gap between the core member and the end fitting member fixed to an end portion of the core member, is characterized in that, if the packing member is once positioned in the end fitting member, the packing member is not moved in a direction pulling up from a position at which the packing member is positioned, when the end portion of the core member is moved in a direction pulling up from the end fitting member.

In the method of producing a composite insulator according to the invention, since a seal portion between the overcoat member and the end fitting member is constructed by curing, it is possible to improve a seal performance between the overcoat member and the end fitting member. Moreover, in the preferred embodiment, it is possible to provide a more firm curing connection between the end fitting member and the overcoat member by roughing an upper surface of the end fitting member or by subjecting a phosphate treatment to a galvanization of a surface of the end fitting member.

In the preferred embodiment of the method of producing a composite insulator according to the invention, the seal portion is cured for connection under a condition such that the end fitting member is not clamped to the end portion of the core member. In addition, the core member itself or an end portion of the core member and an inner surface of a core member insertion hole are finely worked so as to prevent a substantial flow of the overcoat forming material between an outer end surface of the core member and an inner surface of the core member insertion hole of the end fitting member when the end portion of the core member is inserted into the core member insertion hole of the end fitting member, and thus the end fitting member is fixed to the core member before forming operation or the end fitting member is preliminarily fixed to the core member before forming operation. If the overcoat forming material is flowed between an end portion of the core member and an inner surface of the core member insertion hole of the end fitting member, it is not possible to clear an specified tensile strength due to an abrasion resistance between the core member and the end fitting member.

Moreover, in the preferred embodiment of the method of producing a composite insulator according to the invention, since the seal portion defined by the overcoat member, the core member and the end fitting member is integrally formed by arranging the end fitting members to the both end portions of the core member without clamping, setting them in the metal mold, filling the overcoat forming material into an overcoat forming space between an outer surface of the core member and the metal mold, and curing under pressure so as to form the overcoat member and to connect the overcoat member to the end fitting member, or since the boundary between the end fitting member and the overcoat member is sealed by mold-forming the overcoat member around the core member, arranging the end fitting members at both end portions of the core member without clamping in such a manner that an end portion of the end fitting member is overlapped on an end portion of the overcoat member, arranging an insulation polymer material near the boundary exposed externally between the end fitting member and the overcoat member, and heating the insulation polymer material so as to cure the insulation polymer material, or since the boundary between the end fitting member and the overcoat member is sealed by mold-forming the overcoat member around the core member, arranging the end fitting members at both end portions of the core member without clamping in such a manner that a gap is existent between an end portion of the end fitting member and an end portion of the overcoat member, arranging an insulation polymer material in the gap between the end fitting member and the overcoat member, and heating the insulation polymer material so as to cure the insulation polymer material, it is possible to improve the seal performance. In addition, since a clamping operation with respect to an end portion of the core member is performed only once, it is possible to reduce an amount of producing steps of the composite insulator.

Further, in the method of producing a composite insulator comprising a core member, end fitting member fixed to both end portions of the core member, and an overcoat member having a sheath portion formed on an outer surface of the core member and shed portions, the packing member according to the invention is provided for preventing a flow of an overcoat forming material into a gap between the core member and the end fitting member fixed to an end of the core portion. If the packing member is once positioned in the end fitting member, this packing member is not moved in a direction pulling up from a position at which the packing member is positioned, when the end portion of the core member is moved in a direction pulling up from the end fitting member.

Accordingly, in the case that the composite insulator is transferred after the end fitting member is inserted into an end portion of the core member and the packing member is positioned at a predetermined portion in the end fitting member, if an end portion of the core member is moved in a direction pulling up from the end fitting member, the packing member is not moved in a direction pulling up from the position at which the packing member is preliminarily positioned in the end fitting member and is maintained at a predetermined position in the end fitting member.

Therefore, it is possible to stably seal a boundary between the core member and the end fitting member and to prevent a flow of overcoat forming material into a boundary between the core member and an inner surface of the core member insertion hole of the end fitting member. Moreover, since a metal mold is preliminarily heated and shows a thermal expansion due to a shortening of forming time and the core member maintained at room temperature is arranged in the heated metal mold, the overcoat member is formed under such a condition that an end surface of the core member is inserted into the core member insertion hole of the end fitting member with a little gap between an end surface of the core member and a bottom surface of the core member insertion hole or that an end surface of the core member is once connected to an bottom surface of the core member insertion hole and then the core member is slightly pulled up from the core member insertion hole so as to generate a little gap between an end surface of the core member and a bottom surface of the core member insertion hole. Even in the latter case, if the end fitting member is inserted into an end portion of the core member and the packing member is once positioned at a predetermined position in the end fitting member, the packing member is not moved in a direction pulling up from the position at which the packing member is once positioned and is maintained at a predetermined position in the end fitting member. Therefore, it is possible to stably seal a boundary between the core member and the end fitting member and to prevent a flow of overcoat forming material into a boundary between the core member and an inner surface of the core member insertion hole of the end fitting member.

BRIEF DESCRIPTION OF DRAWINGS

FIG. 5(*b*) is an enlarged cross sectional view of the another packing member;

BEST MODE FOR CARRYING OUT THE INVENTION

Figure 1A:
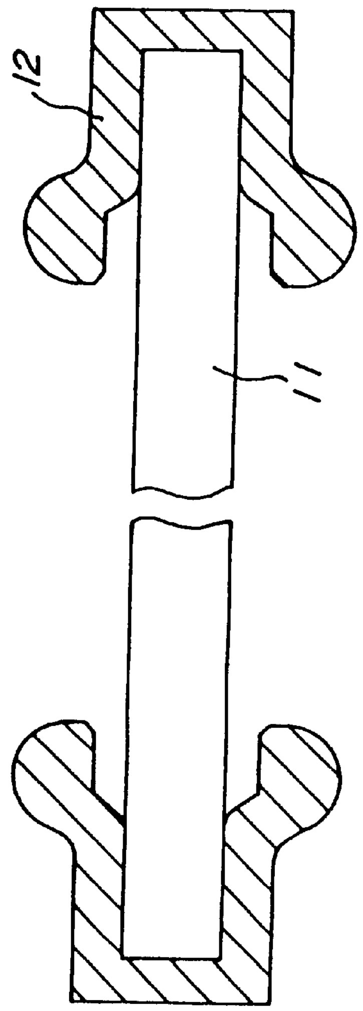
FIG. 1(*a*) and FIG. 1(*b*) are schematic views for explaining one embodiment of a method of producing a composite insulator according to the invention, wherein FIG. 1(*a*) is a cross sectional view showing a state such that the end fitting members are arranged to both end portions of the core member and FIG. 1(*b*) is a cross sectional view illustrating a state such that the core member to which the end fitting members are arranged is set between a pair of metal mold units and the core member is fastened by the metal mold units.
Figure 1B:
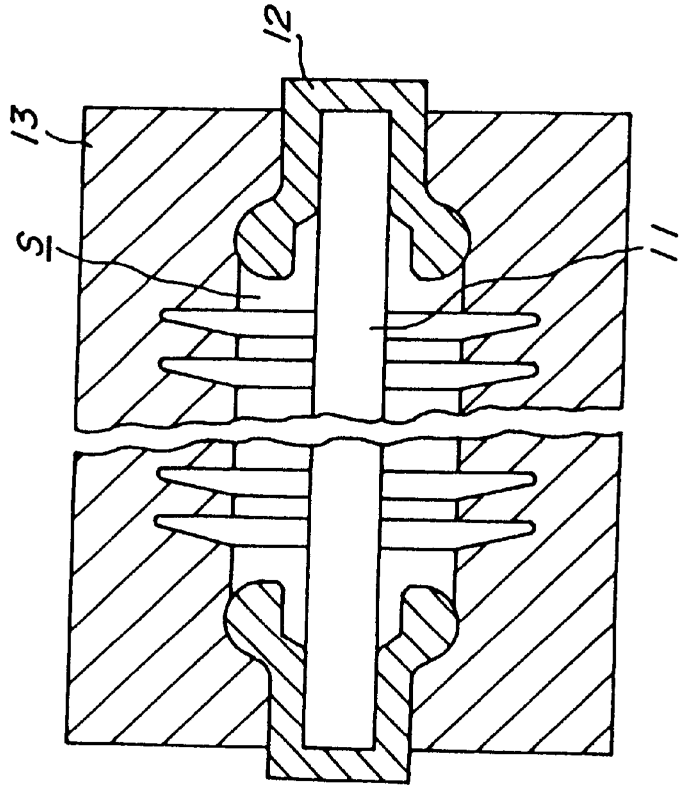

FIG. 1(*a*) and FIG. 1(*b*) are schematic views for explaining one embodiment of a method of producing a composite insulator according to the invention, wherein FIG. 1(*a*) is a cross sectional view showing a state such that the end fitting members are arranged to both end portions of the core member and FIG. 1(*b*) is a cross sectional view illustrating a state such that the core member to which the end fitting members are arranged is set between a pair of metal mold units and the core member is fastened by the metal mold units. Firstly, as shown in FIG. 1(*a*), end fitting members 12 are clamped and fixed to both end portions of an FRP core 11 as a core member. Then, as shown in FIG. 1(*b*), the FRP core 11 to which the end fitting members 12 are clamped at both end portions is set in a metal mold 13. Under such a condition, an overcoat forming material such as silicone rubber is filled in an overcoat forming space s defined on an outer surface of the FRP core 11 in the metal mold 13. After that, the thus filled overcoat forming material is cured by applying heat and pressure thereto, thereby connecting the overcoat forming material to the metal mold 13 and the end fitting members 12. Moreover, as an another embodiment, the end fitting members 12 are clamped for a preliminarily connection to the ends of the FRP core 11 in the step shown in FIG. 1(*a*), and then a composite insulator is once formed according to the same method mentioned above. After that, the end fitting members 12 are clamped again to the ends of the FRP core 11 to obtain a finally formed composite insulator.

In the both embodiments mentioned above, the step of connecting or preliminarily connecting the end fitting members 12 to the ends of the FRP core 11 is for preventing an insertion of the overcoat forming material into a boundary between the end fitting member 12 and the FRP core 11. Moreover, in the both embodiments mentioned above, it is a feature of the invention that the overcoat forming material is cured for connection to the end fitting member 12. In the present invention, a phrase "the overcoat forming material is cured for connection to the end fitting member 12" means that a seal portion between the overcoat member and the end fitting member 12 is chemically reacted to obtain a firm connection by the same reaction as the curing reaction in the overcoat member forming step. It is preferred to perform the step of curing the overcoat forming material to the end fitting member 12 at the same time as that the forming step such that the sheath portion and the shed portions are cured under pressure.

In the embodiments mentioned above, it is preferred to rough a surface of the end fitting member 12 to which the overcoat forming material is contacted when the overcoat forming material is cured for connection to the end fitting member 12. If the surface of the end fitting member 12 is roughed, an oil component for example adhered to the surface can be removed and a surface area used for connection can be increased, so that it is possible to perform a stable curing operation. A portion 95% or more of the cured portion can be used for a connection in the case of the roughed surface, but a portion only 20–80% of the cured portion can be used for a connection in the case of the normal surface. Moreover, if a phosphate treatment is performed with respect to a surface of the end fitting member 12 to which the overcoat forming material is contacted i.e. a surface on which a normal galvanization is performed, a surface area is increased due to a growth of an acicular crystalline of zinc phosphate, and the surface is stabilized and is easy to be connected. Therefore, this is a preferred embodiment.

In the present invention, as an overcoat forming method, compression forming method, injection forming method, and transfer forming method can be used. In this specification, an explanation is made for the composite insulator having a solid core member, but the present invention can be applied for a composite hollow insulator having a cylindrical core member. Here, differences on rubber material, forming condition etc. between the composite insulator and the composite hollow insulator are shown in the following Table 1. As shown in Table 1, rubber material and forming condition such as forming pressure and forming temperature are different between the composite insulator and the composite hollow insulator due to whether the core member is solid or cylindrical. Therefore, it is not always possible to apply the forming condition of the composite hollow insulator to the composite insulator as it is.

TABLE 1

Differences on rubber material or forming condition between hollow insulator and suspension insulator

| Item | Hollow insulator | Suspension insulator |
|---|---|---|
| Rubber state | Liquid | Solid |
| Curing reaction catalyst | Platinum | Organic peroxide |
| Forming stress | 10~20 kgf/cm$^2$ | 80~200 kgf/cm$^2$ |
| Forming temperature | 20~80° C. | 150~200° C. |

In the embodiment mentioned above, when the step of curing the end fitting member and the overcoat member is performed, the end fitting member is connected or preliminarily connected to the FRP core. The present inventors further investigated the embodiment mentioned above, and found the following evidences. That is to say, in the embodiment mentioned above, the overcoat member is formed by arranging the overcoat forming material on an outer portion of the core member after the end fitting member is clamped to the core member for the purpose of preventing a flow of the overcoat forming material. This is because it is not possible to clear a specified tensile strength due to an abrasion resistance between the core member and the end fitting member, if the overcoat forming material is inserted between the end portion of the core member and the inner surface of the core member insertion hole of the end fitting member.

However, the present inventors further investigated in detail the seal performance and the connection condition between the end portion of the core member and the inner surface of the core member insertion hole of the end fitting member, and found the following results. That is to say, in the embodiment mentioned above, a compression stress due to a clamping operation, within a limit such that a crack is not generated in the core member, is applied to the core member. However, since a heat over a glass transition point is applied to the core member during the overcoat member forming step, the core member is shrunk on its diameter and thus there is a possibility such that a tensile strength of the composite insulator is decreased.

Further investigation was conducted on the basis of the results mentioned above and the following preferred embodiments were found.

(1) The overcoat forming material is filled in the overcoat forming space between the outer portion of the core member and the metal mold under the condition such that the packing member for preventing a flow of the overcoat forming material into a gap between the core member and the end fitting member connected to the end of the core member is provided, and is cured under pressure. In this case, it is possible to stably seal a connection portion between the core member and the end fitting member and to prevent a flow of the overcoat forming material into a gap in the connection portion between the core member and the inner surface of the core member insertion hole. In addition, the inner end portion and the outer end portion of the packing member is firmly contacted to an end portion outer surface of the core member and the inner surface of the core member insertion hole of the end fitting member respectively.

(2) The packing member is made of a material which does not prevent a connection performance with the overcoat forming material or a material which does not affect the curing operation. In this case, a desired connection by curing under pressure between the overcoat member and the core member or between the end fitting member and the overcoat member is not prevented even if the packing member is provided. For example, this chan be accomplished by using the same curing agent for those of the overcoat forming material and the packing member.

(3) The inner portion of the end fitting member has a shape such that the packing member can be set in the end fitting member by sliding it. Therefore, even when the packing member is positioned at near but correct position in the end fitting member, the packing member can be slid and positioned in the end fitting member by means of a filled overcoat forming material in the case of filling the overcoat forming material in the overcoat forming space between the metal mold and the outer portion of the core member. Moreover, it is not necessary to position the packing member in the inner portion of the end fitting mold strictly before performing the overcoat member forming, and thus it is possible to perform this step easily.

(4) In the case that the packing member is once positioned in the end fitting member, the packing member is not moved in a direction pulling up from the position at which it is positioned in the end fitting member, even if the end portion of the core member is moved in a direction pulling up from the end fitting member. Even in the case that the overcoat member is formed under such a condition that the end surface of the core member is once contacted to the bottom surface of the insertion hole of the end fitting member and then the core member is pulled up slightly from the end fitting member to form a little gap between the end surface of the core member and the bottom surface of the insertion hole of the end fitting member, with taking into consideration of the case such that the core member before expansion is arranged in a previously heated and expanded metal mold, the packing member is stopped at a predetermined position in the end fitting member without moving in a direction pulling up from a position at which the packing member is positioned with respect to the end fitting member. Therefore, it is possible to stably seal the boundary between the core member and the end fitting member and to prevent the flow of the overcoat forming material into a gap between the core member and the inner surface of the core member insertion hole of the end fitting member.

(5) The packing member is a packing having a V-shape cross section. In this case, both open end portions having a V-shape i.e. an inner end portion and an outer end portion are firmly contacted to an outer surface of the end portion of the core member and an inner surface of the core member insertion hole of the end fitting member respectively, and a valley portion positioned at an intermediate portion of the both end portions having a V-shape is positioned at a side of the bottom portion of the core member insertion hole of the end fitting member as compared wit the both open end portions. In this case, the position of the valley portion is not limited to the just intermediate portion of the both open end portions having a V-shape, and can be deviated toward either sides of the open end portions i.e. an inner side or an outer side in a diameter direction of the open end portions. Moreover, the packing member may have a V-shape cross section to which the end surface of the end fitting member and the surface of the core member near the above end surface are closely contacted. In this case, if the overcoat forming material is filled in the overcoat forming space under such a condition that the packing member is set at an outer surface of the core member, the packing member is closely contacted to the end surface of the end fitting member and the surface of the core member near the end surface mentioned above without being bent by the overcoat forming material filling stress. Therefore, it is possible to prevent the flow of the overcoat forming material into the gap between the end fitting member and the core member.

Figure 2A:
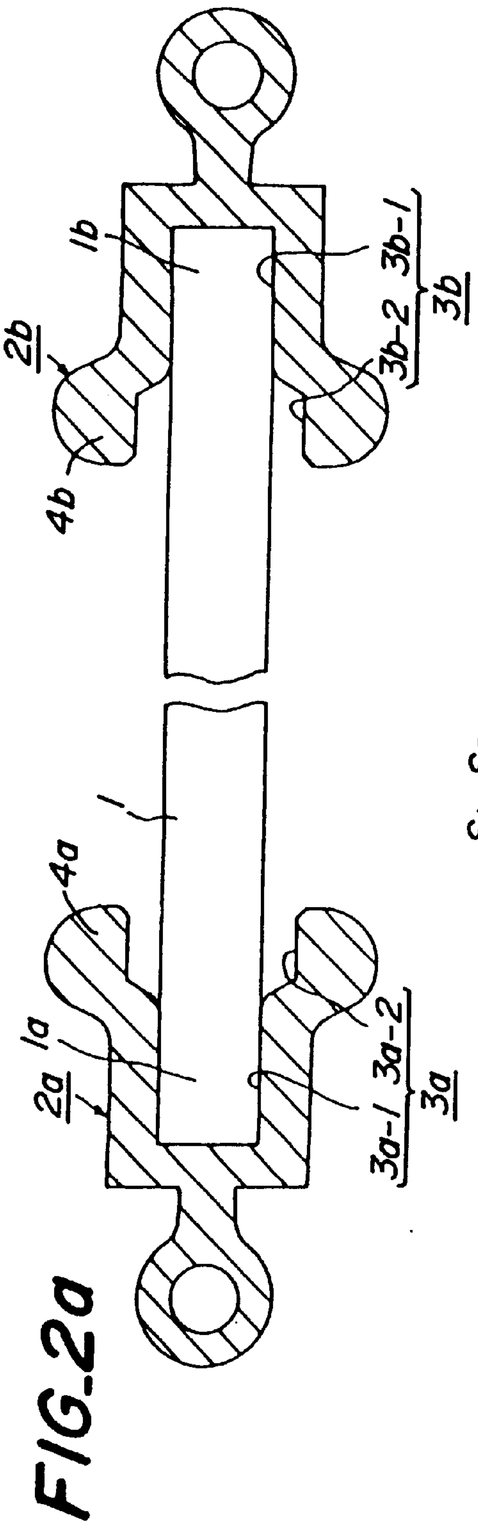
FIG. 2(*a*) is a cross sectional view depicting a state such that the end fitting members are arranged to both end portions of the core member and FIG. 2(*b*) is a cross sectional view showing a state such that the core member to which the end fitting members are arranged at the both end portions is set between a pair of metal mold units and the core member is fastened by the metal mold units.
Figure 2B:
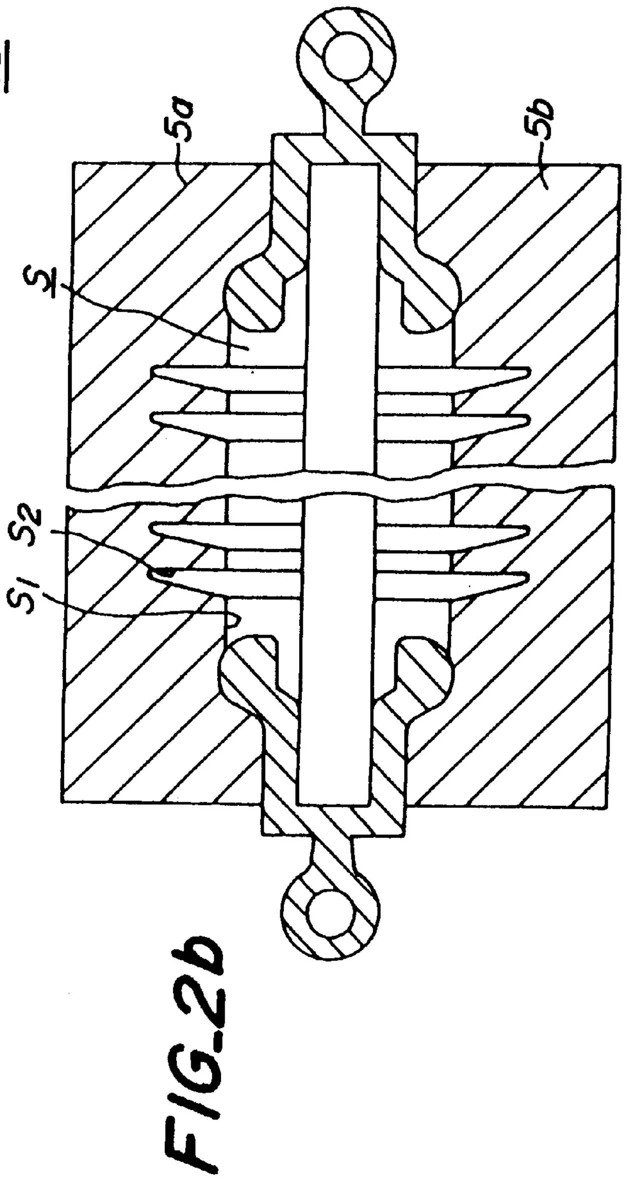

Hereinafter, preferred embodiments mentioned above will be explained with reference to the drawings. FIG. 2(*a*) is a cross sectional view showing a state such that the end fitting members are arranged on the both end portions of the core member, and FIG. 2(*b*) is a cross sectional view illustrating a state such that the core member to which the end fitting members are arranged at the both end portions is set between a pair of metal mold units and the core member is fastened by the metal mold units. In the figure, end fitting members 2*a*, 2*b* are arranged respectively to both end portions 1*a*, 1*b* of a core member 1 without clamping. Core member insertion holes 3*a*, 3*b* are formed in the end fitting members 2*a*, 2*b* respectively, and respective core member insertion holes 3*a*, 3*b* have a two step hole construction comprising first small diameter hole portions 3*a*-1, 3*b*-1 positioned at an outer side in an axial direction and second large diameter hole portions 3*a*-2, 3*b*-2 positioned at an inner side in an axial direction. Diameters of the first small diameter hole portions 3*a*-1, 3*b*-1 are worked in such a manner that the column shaped core member is inserted with substantially no gap into inner surfaces of the small diameter hole portions. Diameters of the second large diameter hole portions 3*a*-2, 3*b*-2 positioned at the inner side in the axial direction are larger than an outer diameter of the core member and thus a part of the overcoat member is existent in a gap defined by an outer surface of the core member and an inner surface of the large diameter hole portion. In this manner, a seal length between the end fitting member and the overcoat member is increased, and thus it is possible to improve a seal performance. Cylindrical expanding portions 4*a*, 4*b* positioned at an outer side in a radial direction are arranged at cylindrical open end portions of the large diameter hole portions 3*a*-2, 3*b*-2 of the end fitting members, and a seal length between the end fitting member and the overcoat member is further increased in the same manner as that of the large diameter hole portion, so that a seal performance is further improved.

FIG. 2(*b*) is a cross sectional view illustrating a state such that the core member 1 to which the end fitting members 2*a*, 2*b* are arranged at the both end portions 1*a*, 1*b* is set between a pair of metal mold units 5*a*, 5*b* and the core member is fastened by the metal mold units. An overcoat forming space S is formed between a pair of the metal mold units 5*a*, 5*b*. The over-coat forming space S comprises a sheath forming portion S1 and shed forming portions S2. Close contacts are accomplished between outer surfaces of open cylindrical end portions of the large diameter hole portions 3*a*-2, 3*b*-2 of the end fitting members and the opposed metal mold units and between the core member and inner surfaces of the core member insertion holes of the end fitting members, and thus an outer side and an inner side seals in a radial direction are achieved. The cylindrical expanding portions 4*a*, 4*b* positioned at an outer side in a radial direction are closely contacted to end portions of the overcoat forming space S of the metal mold units. An overcoat forming material is supplied in the overcoat forming space S from an overcoat forming material feeding path not shown, and an overcoat member is formed on an outer surface of the core member in the overcoat forming space S by heating the overcoat forming material under pressure, so that the overcoat member is connected to the opposed surface of the end fitting member. If necessary, a primer is preliminarily sprayed on surfaces of the end fitting member and the core member to which the overcoat member is contacted, and thus the overcoat member is connected to an outer surface of the core member and the opposed surface of the end fitting member via a primer. After that, a pair of the metal mold units 5*a*, 5*b* are opened to pull up a formed composite insulator body, and the end fitting members are clamped at the both end portions of the core member under a predetermined clamping stress.

Figure 3A:
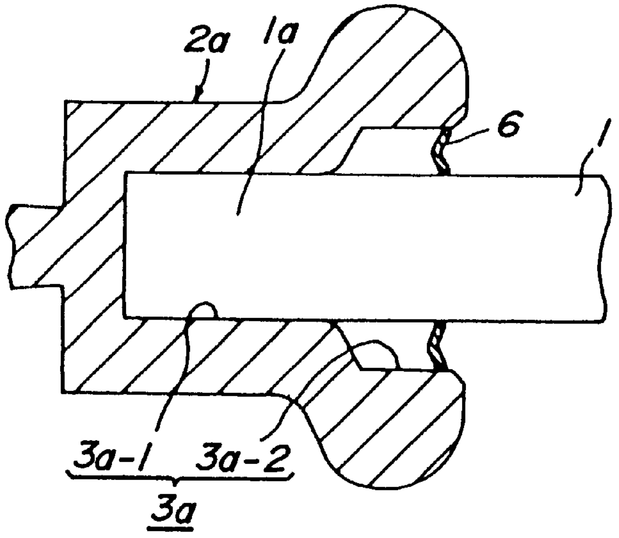
FIGS. 3(*a*)–(*c*) are schematic views for explaining a method of producing a composite insulator according to the invention in which an overcoat forming material is filled in a overcoat forming space S between an outer portion of the core member and the metal mold under the condition such that a packing member 6 is provided for preventing a flow of overcoat forming material into a gap between the core member and the end fitting member arranged to an end portion of the core member, and the overcoat forming material is cured under pressure.
Figure 3B:
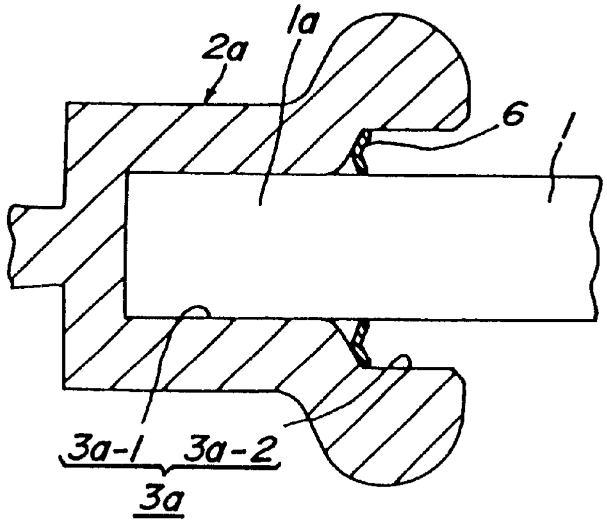
Figure 3C:
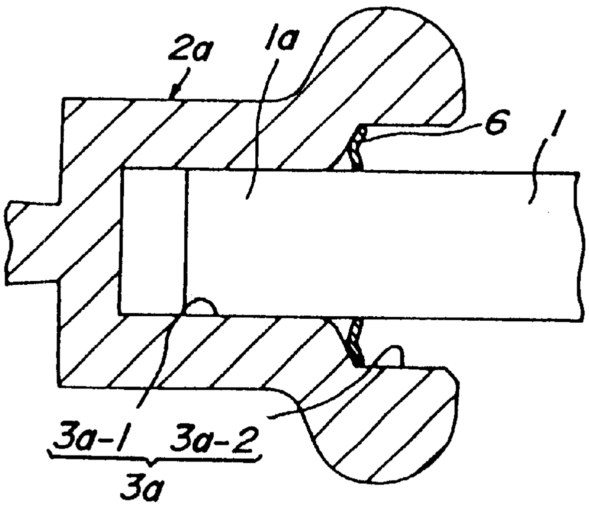
Figure 4:
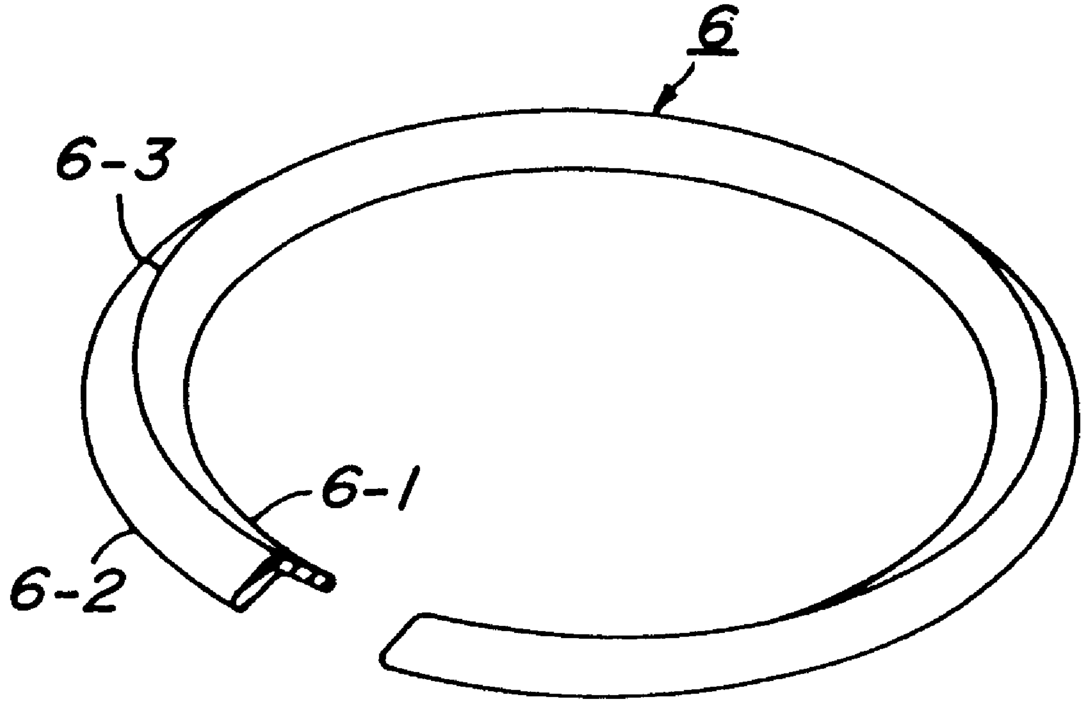
FIG. 4 is a perspective view showing a packing member.

FIGS. 3(*a*)–(*c*) are schematic views for explaining a method of producing a composite insulator according to the invention in which the overcoat forming material is filled in the overcoat forming space S between an outer portion of the core member and the metal mold under the condition such that a packing member 6 is provided for preventing a flow of the overcoat forming material into a gap between the core member 1 and the end fitting member 3*a* (same as end fitting member 3*b*) arranged to an end portion of the core member, and the overcoat forming material is cured under pressure. In this embodiment, an inner shape of the large diameter hole portion 3*a*-2 of the core member insertion hole 3*a* in the end fitting member 2 permits a sliding of the packing member 6 so as to set the packing member 6. In FIGS. 3(*a*)–(*c*), the packing member 6 has a V-shape cross section (refer to FIG. 4), and the both open end portions i.e. an inner end portion 6-1 and an outer end portion 6-2 are firmly contacted to an outer surface of the end portion of the core member 1 and an inner surface of the large diameter hole portion 3*a*-2 of the end fitting member 2 respectively. In addition, the valley portion 6-3 positioned at an intermediate portion of the both open end portions having a V-shape is positioned at a bottom side of the core member insertion hole (small diameter hole portion) as compared with the both open end portions. In this case, the valley portion is positioned at just intermediate portion of the both open end portions having a V-shape.

FIG. 3(*a*) shows an intermediate step for positioning the packing member at a predetermined position on the bottom portion of the large diameter hole portion 3*a*-2 of the end fitting member 2*a* shown in FIG. 3(*b*). The core member 1 shown in the state illustrated in FIG. 3(*b*), in which the end fitting members 2*a*, 2*b* are arranged to the both end portions 1*a*, 1*b*, is set between a pair of the metal mold units 5*a*, 5*b*, and the metal mold units 5*a*, 5*b* are closed. After that, the overcoat member is formed in the same manner as explained in FIG. 2(*b*), and then the end fitting members may be clamped to the core member if necessary. Otherwise, the core member 1 maintained in the state shown in FIG. 3(*a*), in which the end fitting members 2*a*, 2*b* are arranged to the both end portions 1*a*, 1*b*, is set between a pair of the metal mold units 5*a*, 5*b*, and the metal mold units 5*a*, 5*b* are closed. After that, the overcoat member is formed in the same manner as explained in FIG. 2(*b*), and then the end fitting members are clamped to the core member. In this case, the packing member is deformed externally in an axial direction by the overcoat forming material supplied in the overcoat forming space S, and is positioned as shown in FIG. 3(*b*).

FIG. 3(*c*) is a schematic view explaining the state such that the packing member is not moved in a direction pulling up from the position at which it is set in the end fitting member even if the end portion of the core member is moved in a direction pulling up from the end fitting member. That is to say, even in the case that the overcoat member is formed under such a condition that the end surface of the core member is once contacted to the bottom surface of the insertion hole of the end fitting member and then the core member is pulled up slightly from the end fitting member to form a little gap between the end surface of the core member and the bottom surface of the insertion hole of the end fitting member, with taking into consideration of the case such that the core member maintained at room temperature is arranged in a previously heated and expanded metal mold, the packing member is stopped at a predetermined position in the end fitting member without moving in a direction pulling up from a position at which the packing member is positioned with respect to the end fitting member. Therefore, it is possible to stably seal the boundary between the core member and the end fitting member and to prevent the flow of the overcoat forming material into a gap between the core member and the inner surface of the core member insertion hole of the end fitting member.

Figure 5A:
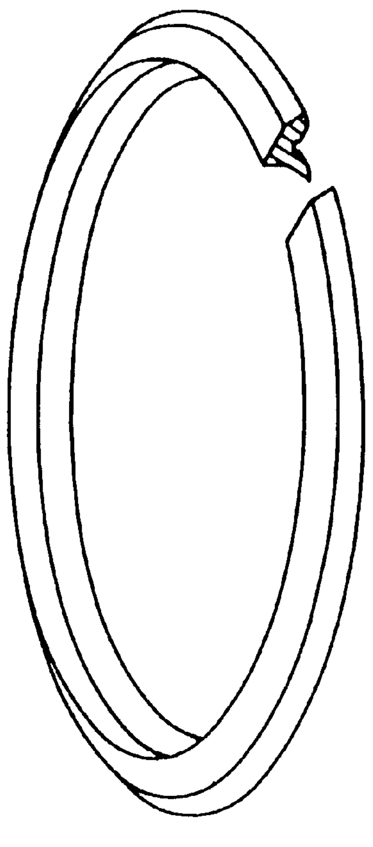
FIG. 5(*a*) is a perspective view illustrating another packing member.
Figure 5B:
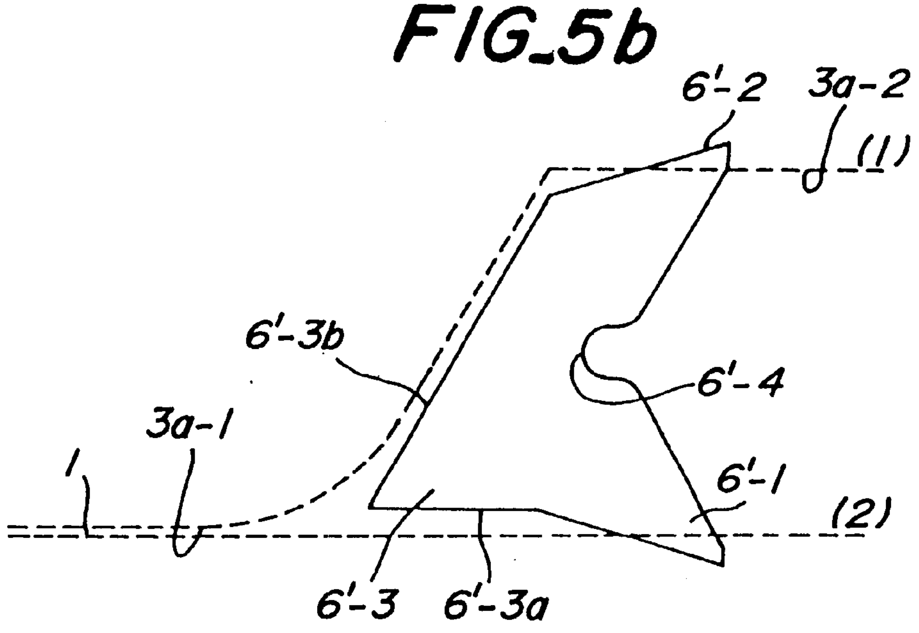
Figure 6:
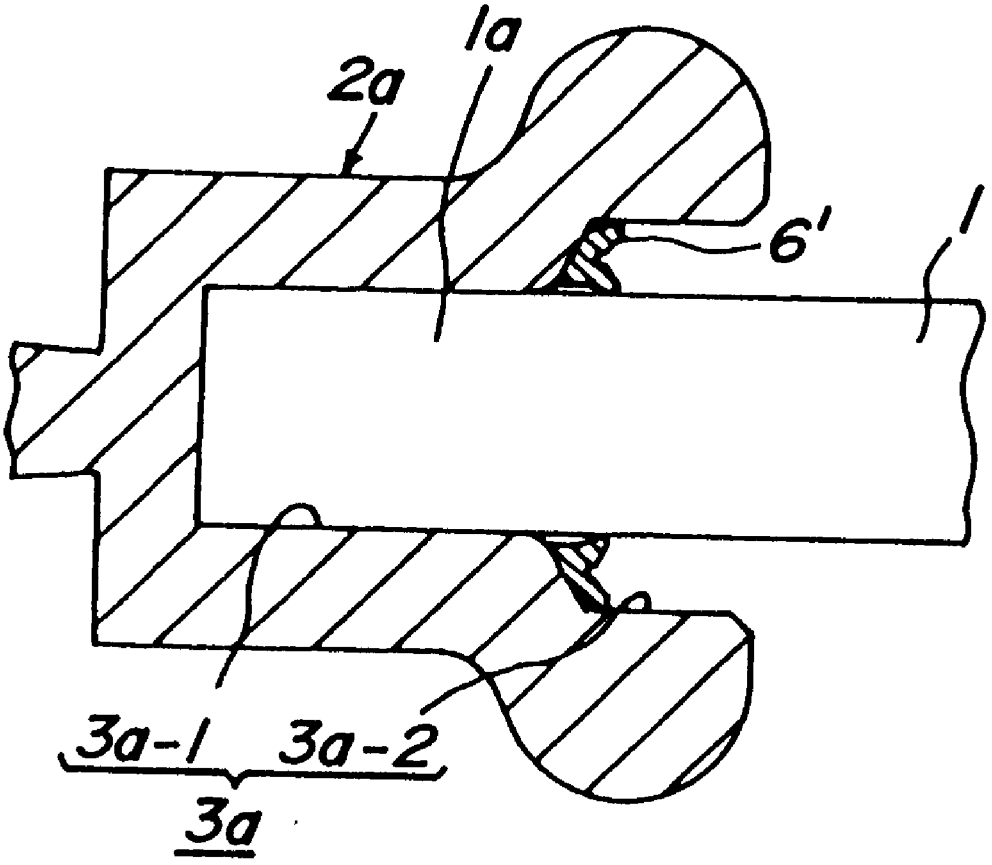
FIG. 6 is a cross sectional view depicting a state such that the packing member shown in FIG. 5 is firmly connected to an end surface of the end fitting member and an outer surface of the core member near the end surface of the end fitting member.

FIG. 5(*a*) and FIG. 5(*b*) are a perspective view and an enlarged cross sectional view respectively showing another embodiment of the packing member shown in FIGS. 3(*a*)–(*c*). FIG. 6 is a cross sectional view showing the state such that a packing member 6' is closely contacted to the inner side in a radial direction of the core member insertion hole 3*a* i.e. the end surface of the large diameter hole portion 3*a*-2 and the outer surface of the core member near the end surface mentioned above. The packing member 6' has little different construction and function as those of the packing member 6, but has a substantially same function as that of the packing member 6 shown in FIGS. 3(*a*)–(*c*). Therefore, the same explanations conducted for the packing member 6 may be applied to the packing member 6'. Hereinafter, different points will be explained mainly.

The packing member 6' has the similar shape as that of the packing member 6 and has a cross sectional shape shown in FIG. 5(*b*). More detail explanation is as follows. The packing member 6' comprises a small diameter end portion 6'-1 which is contacted to the outer surface of the core member under expanded state, a large diameter end portion 6'-2 which is contacted to the inner side in an axial direction of the core member insertion hole 3*a* provided in the end fitting member under shrunk state i.e. the inner surface of the second large diameter hole portion 3*a*-2, and a connection end portion 6'-3 connected between the small diameter end portion 6'-1 and the large diameter end portion 6'-2 and positioned at the outer side in an axial direction when the packing member is set between the core member and the end fitting member. In addition, a cylindrical depression portion 6'-4 serving as an easy bending in a radial direction of the small diameter end portion 6'-1 and the large diameter end portion 6'-2 is provided at the inner side in an axial direction between the small diameter end portion 6'-1 and the large diameter end portion 6'-2. In FIG. 5(*a*) and FIG. 5(*b*), no load is applied to the packing member 6', and a broken line (1) and a broken line (2) show respectively a fictitious inner surface of the large diameter hole portion 3*a*-2 provided at the inner side in an axial direction of the core member insertion hole 3*a* and a fictitious outer surface of the core member. A first surface 6'-3*a* of the connection end portion 6'-3 opposed to the core member is extended substantially parallel to the outer surface of the core member. Moreover, a second surface 6'-3*b* opposed to an inner end surface of the second large diameter hole portion 3*a*-2 provided at an inner side in an axial direction of the core member insertion hole 3*a* of the end fitting member is extended substantially parallel to the inner end surface of the second large diameter hole portion 3*a*-2.

The overcoat forming material is filled in the overcoat forming space after the packing member 6' is arranged to the outer surface of the core member and is positioned in the second large diameter hole portion 3*a*-2 provided at the inner side in an axial direction of the core member insertion hole 3*a* of the end fitting member and the metal mold units are closed. In this case, the packing member 6' can be firmly fitted to the end surface of the second large diameter hole portion 3*a*-2 provided at the inner side in an axial direction of the core member and the outer surface of the core member near the end surface mentioned above. Therefore, it is possible to effectively prevent a flow of the overcoat forming material into the gap between the outer surface of the core member and the end fitting member. Moreover, when the packing member 6' is pressed toward the metal member 3*a* by a forming stress and is deformed, the first surface 6'-3*a* is firmly contacted to the core member, and the second surface 6'-3*b* is firmly contacted to the connection surfaces of the metal member inner surfaces 3*a*-1, 3*a*-2. Therefore, it is possible to prevent a flow of the overcoat forming material into the gap between the outer surface of the core member and the end fitting member.

Figure 7B:
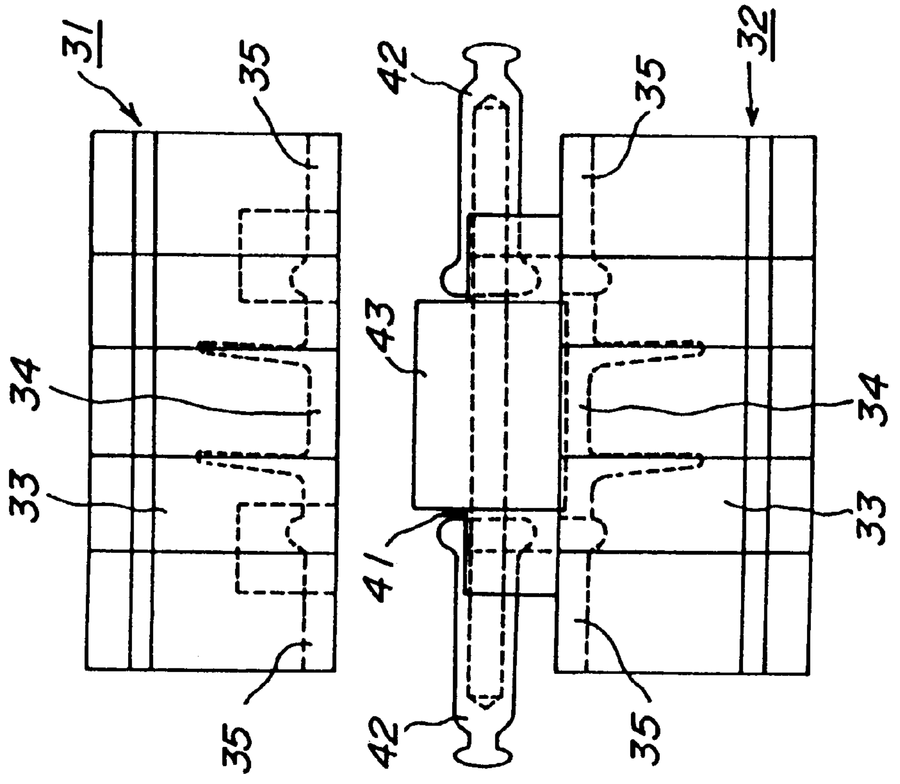
FIG. 7(*a*) and FIG. 7(*b*) are schematic views explaining one preferred embodiment of a method of producing a composite insulator according to the invention.
Figure 7A:
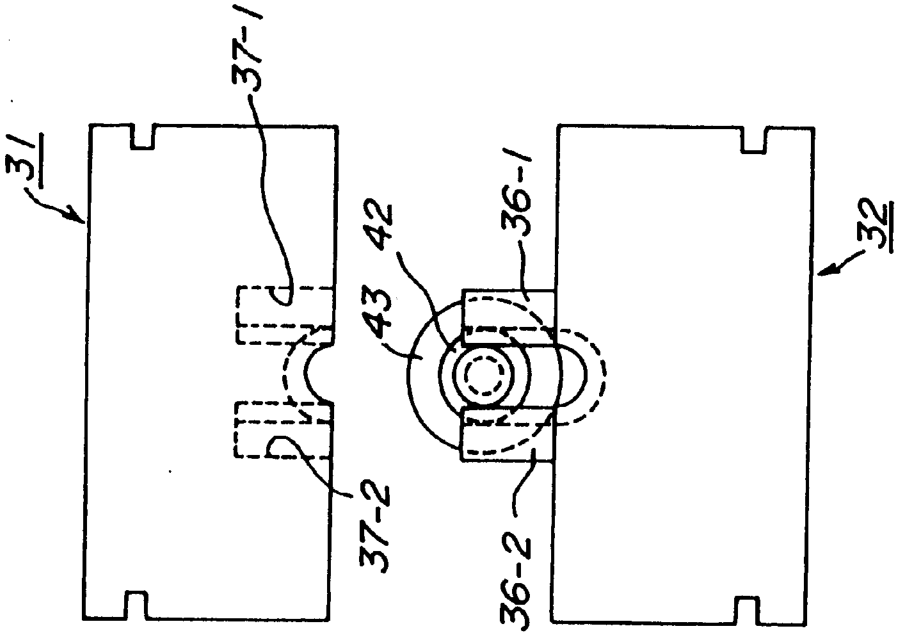
Figure 8A:
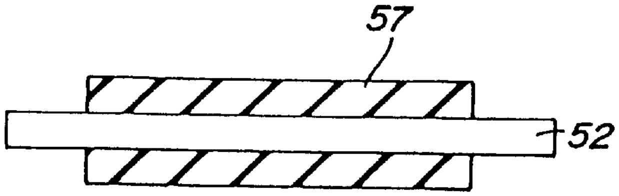
FIGS. 8(*a*)–(*d*) are schematic views showing another method of producing a composite insulator according to the invention in an order of producing steps.
Figure 8B:
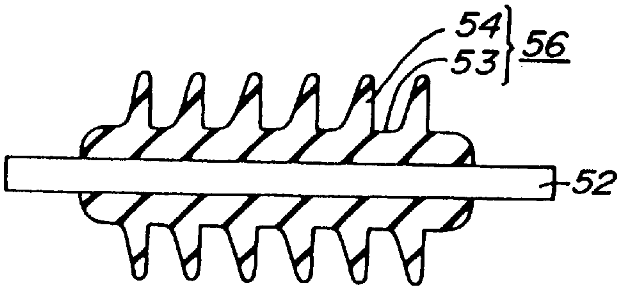
Figure 8C:
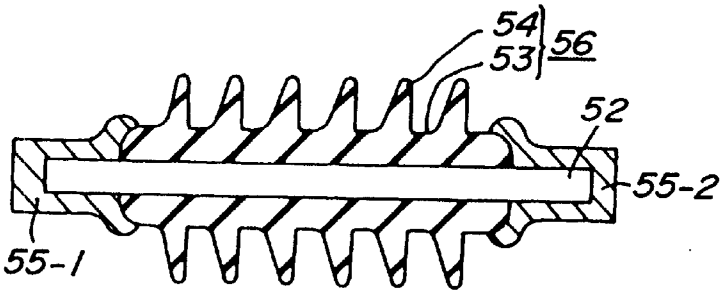
Figure 8D:
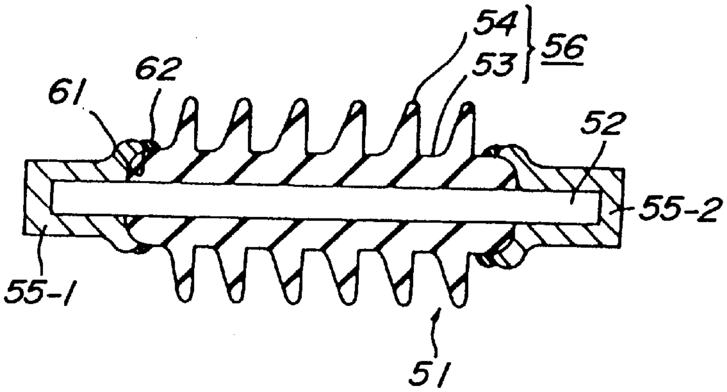

Then, as a further preferred embodiment according to a method of producing a composite insulator according to the invention, an example such that the overcoat member is formed by a compression forming and the end fitting member is introduced into a predetermined position in the metal mold by using a guide provided in the metal mold will be explained. FIG. 7(*a*) and FIG. 7(*b*) are schematic views explaining the preferred embodiment in the method of producing a composite insulator according to the invention, wherein FIG. 7(*a*) shows a side view and FIG. 7(*b*) illustrates a front view. In the embodiment shown in FIGS. 7(*a*) and (*b*), an upper metal mold 31 and a lower metal mold 32 are respectively constructed by integrating a plurality of segments.

Both of the upper metal mold 31 and the lower metal mold 32 have a cavity 35 for setting end fitting members 42 provided at the both end portions of an FRP core 41. Moreover, in the upper metal mold 32, a guide is constructed in such a manner that a pair of guide bars 36-1, 36-2 having a space with each other whose distance is substantially same (little larger) as (than) a diameter of the end fitting member 42 are arranged upwardly at end portions corresponding to the end fitting members 42 respectively. Further, cavities 37-1, 37-2, in which the guide bars 36-1, 36-2 are settable when the upper metal mold 31 and the lower metal mold 32 are closed, are arranged at portions of the upper metal member 32 corresponding thereto.

A method of forming the overcoat member by a compression forming by means of the upper metal mold 31 and the lower metal mold 32 mentioned above is as follows. At first, a forming rubber 43 is wound and set on an outer surface of the FRP core 41 in which the end fitting members 42 are inserted into its end portions without clamping. Then, the FRP core 41, in which the forming rubber 43 and the end fitting members 42 are set, is set at a predetermined position on the lower metal mold 32 i.e. the end fitting members 42 are set between the guide bars 36-1, 36-2 and the end fitting members 42 are positioned at portions corresponding to the cavity 35. After the settings mentioned above, if a stress is applied under heating condition to the upper metal mold 31 and the lower metal mold 32 so as to close them, a desired composite insulator can be formed by a compression forming.

Then, another embodiment of a method of producing a composite insulator according to the invention will be explained. FIGS. 8(*a*)–(*d*) are schematic views showing successive steps of the another embodiment of the method of producing the composite insulator according to the invention in order. A construction of a polymer insulator as one example of the composite insulator according to the invention is the same as that of the known polymer insulator. In this embodiment, as shown in FIG. 8(*a*), a layer 57 made of an overcoat forming insulation polymer material, here silicone rubber, for forming an overcoat member 56 comprising a sheath portion 53 and shed portions 54 is formed around an FRP core 52. Then, as shown in FIG. 8(*b*), the overcoat member 56 comprising the sheath portion 53 and shed portions 54 is formed by performing a mold operation using the metal mold not shown. Then, as shown in FIG. 8(*c*), end fitting members 55-1, 55-2 are inserted into both end portions of the FRP core 52. Respective steps explained up to here are the same as those of the known one.

Figure 9:
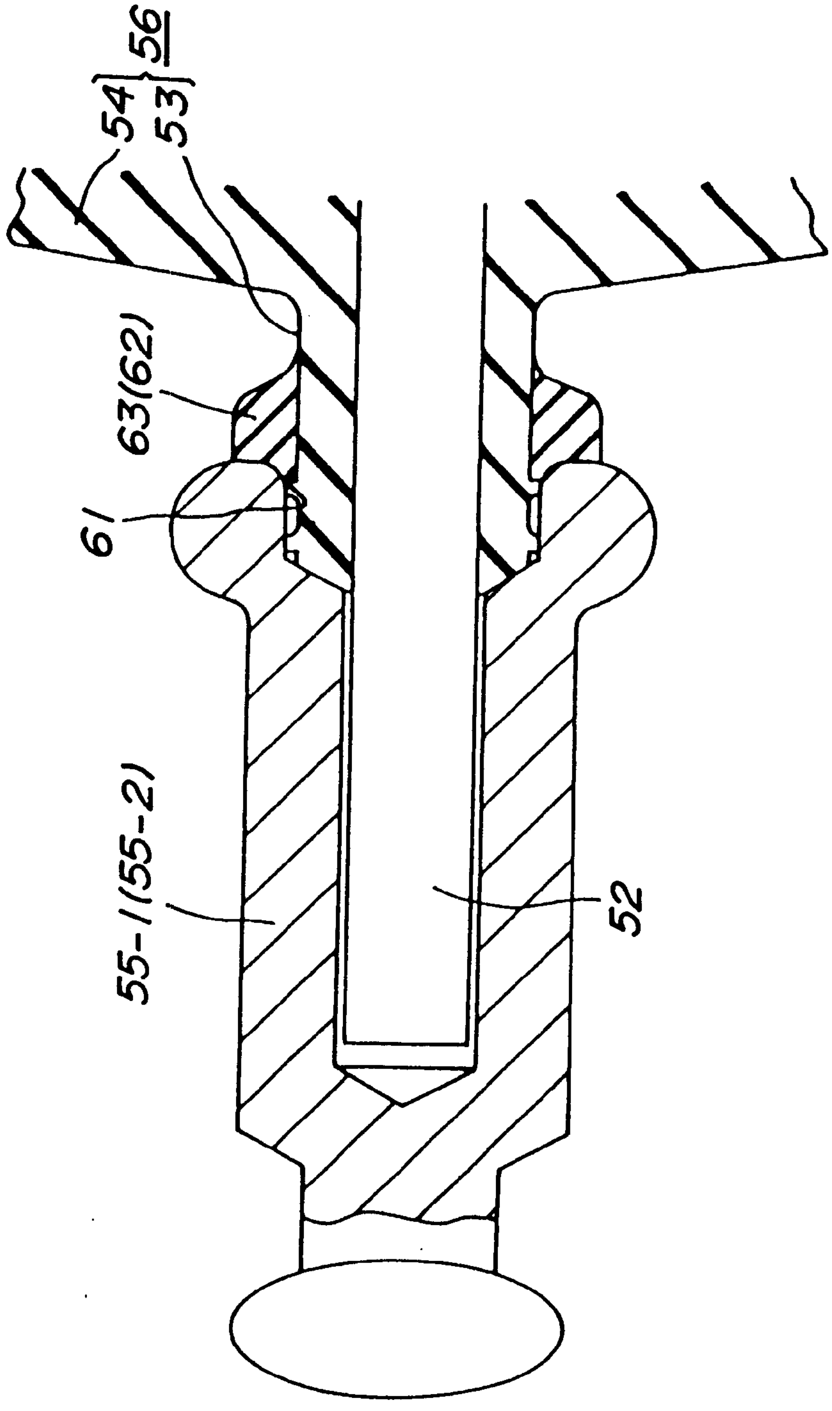
FIG. 9 is a schematic view illustrating one end portion of the composite insulator obtained according to the another method of producing a composite insulator according to the invention.
Figure 10A:
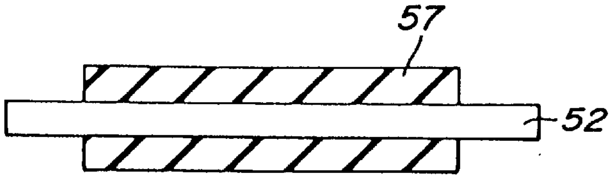
FIGS. 10(*a*)–(*d*) are schematic views depicting still another method of producing a composite insulator according to the invention in an order of producing steps.
Figure 10B:
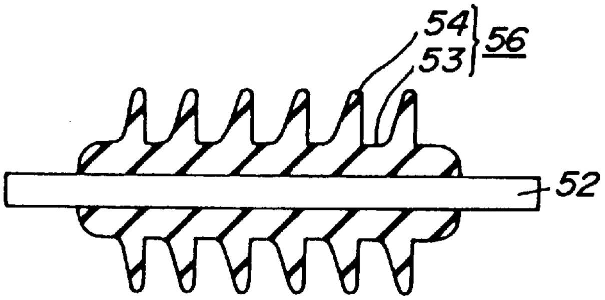
Figure 10C:
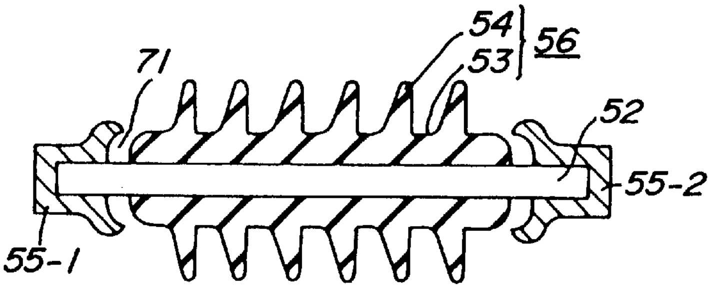
Figure 10D:
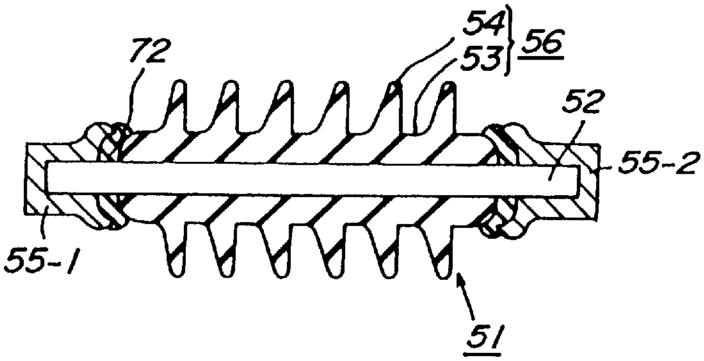

Features of the another embodiment according to the invention mentioned above are as follows. As shown in FIG. 8(*d*), when the end fitting members 55-1, 55-2 are arranged to both ends of the FRP core 52, the end portions of the end fitting members 55-1, 55-2 are overlapped on the end portion of the overcoat member 56, and a silicone rubber member 62 made of preferably the same material as that of the overcoat member 56 is arranged on a boundary 61 exposed to the external atmosphere between the end fitting members 55-1, 55-2 and the overcoat member 56 in such a manner that the silicone rubber member 62 covers circumferentially all of the boundary 56. Then, the thus obtained body is heated so as to cure the silicone rubber member 62, so that the boundary 61 between the end fitting members 55-1, 55-2 and the overcoat member 56 is sealed. After that, the end fitting members 55-1, 55-2 are clamped. In this manner, as shown in FIG. 9 as one end portion, it is possible to obtain the polymer insulator 51 having a seal portion 63 made of a cured connection portion showing an excellent seal performance between the end fitting members 55-1, 55-2 and the overcoat member 56. In the polymer insulator 51 according to the invention produced in the manner shown in FIG. 8, since the cured connection portion showing an excellent seal performance is existent on the boundary 61 between the end fitting members 55-1, 55-2 and the overcoat member 56, a seal performance of the polymer insulator 51 as a whole can be improved.

In the another embodiment according to the invention, when the seal portion 63 is cured, the end fitting members 55-1, 55-2 are not clamped to the FRP core 52. Therefore, non-cured rubber used for a curing connection may be intruded between the inner surfaces of the end fitting members 55-1, 55-2 and the end portion of the sheath portion 53. In order to prevent such a non-cured rubber intrusion, prior to form the seal portion 63 by curing, it is preferred to firmly contact the inner surfaces of the end fitting members 55-1, 55-2 with respect to the end portion of the sheath portion 53.

Figure 11:
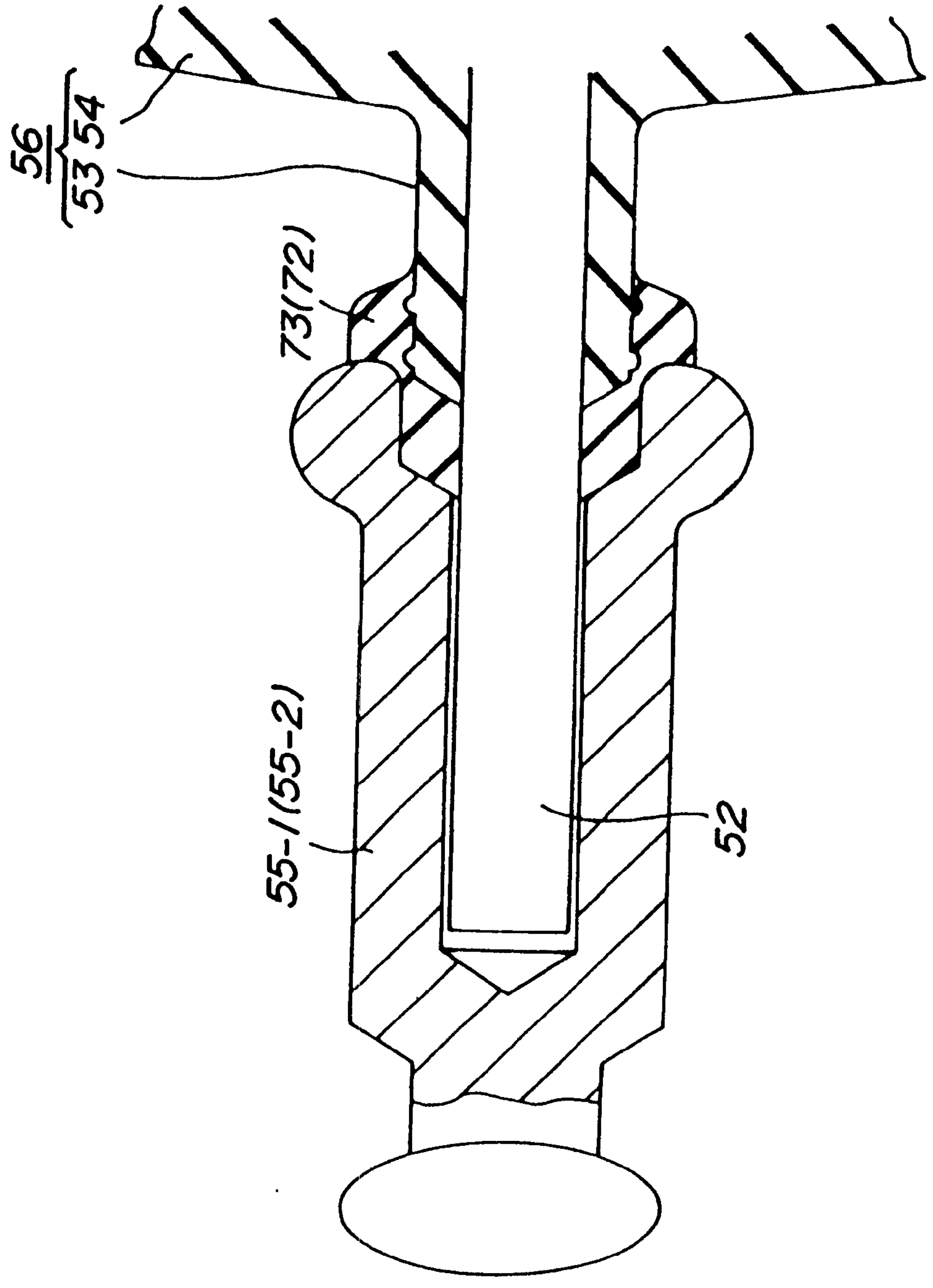
FIG. 11 is a schematic view showing a construction of one end portion of the composite insulator obtained according to the still another method of producing a composite insulator according to the invention.

FIGS. 10(*a*)–(*d*) are schematic views showing successive steps of still another embodiment of the method of producing the composite insulator according to the invention in order. In this embodiment, respective steps shown in FIGS. 10(*a*)–(*c*) are same as those of the embodiments shown in FIGS. 8(*a*)–(*c*). In this embodiment, different points from the embodiment shown in FIGS. 8(*a*)–(*c*) are as follows. The end fitting members 55-1, 55-2 are arranged at the both ends of the FRP core 52 in such a manner that a gap 71 is existent between the end portions of the end fitting members 55-1, 55-2 and the end portion of the overcoat member 56, and a silicone rubber member 72 made of preferably the same material as that of the overcoat member 56 is arranged in the gap 71 between the end portions of the end fitting members 55-1, 55-2 and the end portion of the overcoat member 56. Then, the thus obtained body is heated so as to cure the silicone rubber member 72, so that portions between the end fitting members 55-1, 55-2 and the overcoat member 56 are sealed by the seal portion 73. In this manner, the polymer insulator 51 whose one end portion is shown in FIG. 11 can be obtained. Also in this embodiment, since the seal portion made of a cured connection portion showing an excellent seal performance is existent between the end portions of the end fitting members 55-1, 55-2 and the end portion of the overcoat member 56, a seal performance of the polymer insulator 51 as a whole can be improved.

In the still another embodiment according to the invention mentioned above, when the seal portion made of the silicone rubber member 72 is cured, the end fitting members 55-1, 55-2 are not clamped to the FRP core 52. Therefore, non-cured silicone rubber member 72 may be intruded between the inner surfaces of the end fitting members 55-1, 55-2 and the end portion of the sheath portion 53. In order to prevent such a non-cured rubber intrusion, in the still another embodiment according to the invention mentioned above, it is preferred that use is made of the packing member 6 as shown in the previous embodiments mentioned above and the packing member 6 is arranged on surfaces of the end portions of the end fitting members 55-1, 55-2 which are contacted to the silicone rubber member 72.

The polymer insulators 51 according to the another embodiment and the still another embodiment mentioned above have an advantage such that it is previously formed since only the overcoat member 56 can be previously molded to the FRP core 52 in addition to the above mentioned improvement of the seal performance. Moreover, it can deal with an alternation of the shape of the end fitting member preferably. Further, in the embodiment mentioned above, an explanation is made to the example of the compression forming such that the overcoat forming material is arranged on the FRP core 52 and is molded by the metal mold, but the present invention can be used for the other forming methods such as the injection forming such that the overcoat forming material is injected in the metal mold in which the FRP core 52 is set. Furthermore, as a material of the seal portion which is cured later, the present invention can be achieved even if the other material as that of the overcoat member 6 is used.

Figure 12:
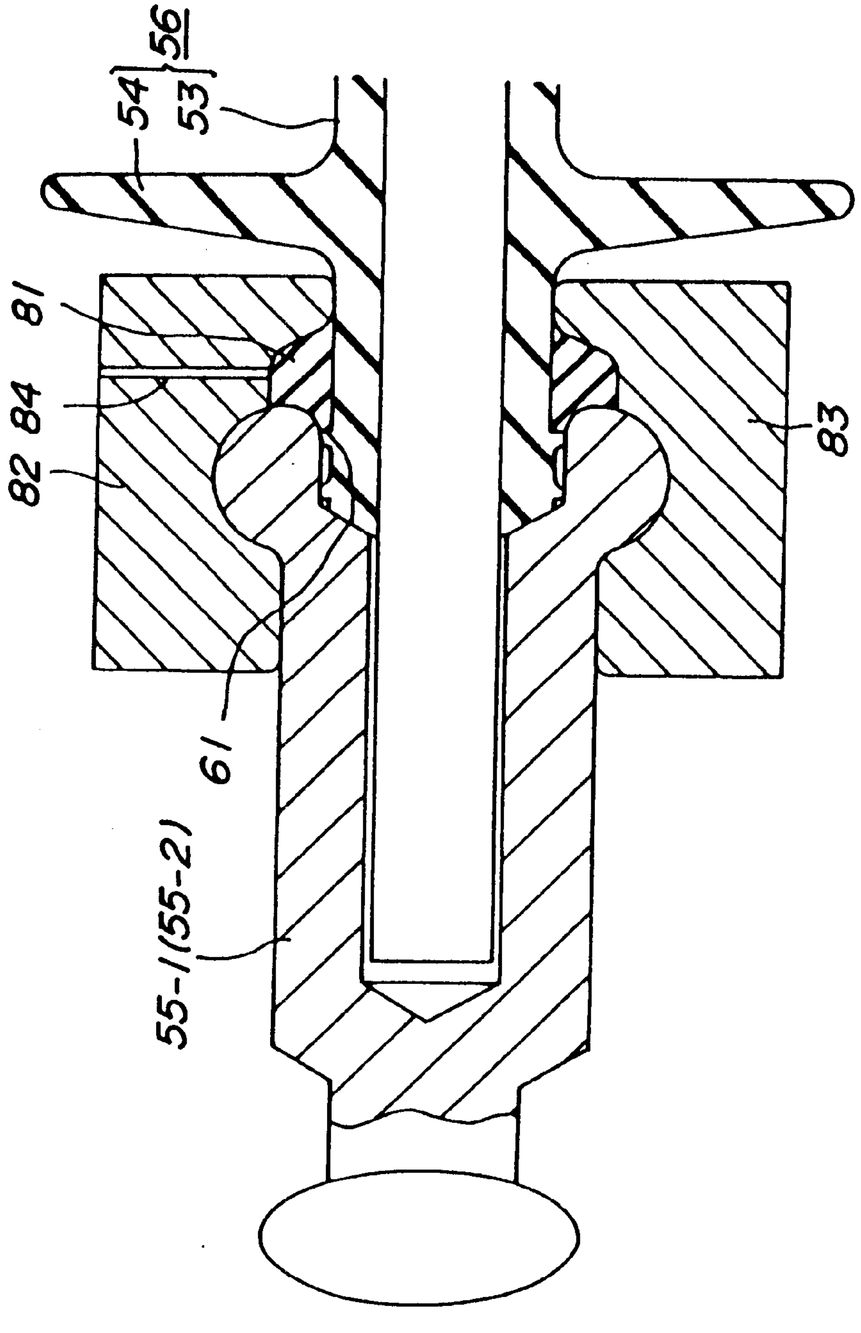
FIG. 12 is a schematic view illustrating one embodiment of a forming method of a seal portion in the present invention.

FIG. 12 is a schematic view showing a state such that the boundary 61 between the end fitting members 55-1, 55-2 and the overcoat member 56 is sealed in the another embodiment according to the invention. In this embodiment, a pair of an upper metal mold 82 and a lower metal mold 83 are set in such a manner that a cavity 81 is formed near the boundary 61 between the end fitting members 55-1, 55-2 and the overcoat member 56. Then, silicone rubber is supplied into the cavity 81 through a supply inlet 84. After that, the upper and lower metal molds are heated to form a seal portion near the boundary 61 between the end fitting members 55-1, 55-2 and the overcoat member 56. Also in the still another embodiment according to the invention, it is possible to form the seal portion in the substantially same manner as that of the another embodiment mentioned above.

Industrial Applicability

As clearly understood from the above explanations, according to the method of producing the composite insulator of the present invention, since the seal portion between the overcoat member and the end fitting member is cured for connection, it is possible to improve the seal performance between the overcoat member and the end fitting member. Moreover, according to the packing member of the present invention, since a construction of the packing member is specified, it is possible to firmly seal a portion between the core member and the end fitting member and to prevent a flow of the overcoat forming material into a portion between the core member and the inner surface of the core member insertion hole of the end fitting member.

What is claimed is:

1. A method of producing a composite insulator having a core member, end fitting members fixed to both end portions of the core member, and an overcoat member, said overcoat member including shed members and a sheath portion formed on an outer surface of the core member, said method comprising:

clamping an end fitting member to each end portion of a core member;

then setting said core member with said end fitting members clamped thereto into a mold;

then filling an overcoat forming material in an overcoat forming space in said mold on an outer portion of said core member;

then curing said overcoat forming material under pressure to form an overcoat member; and then again clamping each end fitting member to each end portion of said core member.

2. The method according to claim 1, wherein a primer is applied to the end fitting member before the overcoat member is formed on the outer surface of the core member.

3. The method according to claim 1, wherein the overcoat member is formed by compression.

4. The method according to claim 3, wherein the end fitting member is introduced into a predetermined position in the mold by using a guide provided in the metal mold when the overcoat member is formed by compression.

5. A method as recited in claim 1, wherein prior to said filling an overcoat forming material, a surface of the end fitting member is subjected to a phosphate treatment.

6. The method according to claim 5, wherein a primer is applied to the end fitting member before said filling an overcoat forming material.

7. The method of claim 1, wherein said overcoat member comprises silicone rubber.

8. The method according to claim 1, wherein a surface of each end fitting member is roughened prior to said curing said overcoat forming material.

9. A method of producing a composite insulator having a core member, end fitting members fixed to both end portions of the core member, and an overcoat member, said overcoat member including shed members and a sheath portion formed on an outer surface of the core member, said method comprising:

positioning an end fitting member at each end portion of a core member;

then setting a core member and said end fitting members into a mold;

inserting packing members in gaps between said core member and said end fitting members;

then filling an overcoat forming material in an overcoat forming space in said mold on an outer portion of said core member;

curing said overcoat forming material under pressure to form an overcoat member; and then clamping each end fitting member to each end portion of said core member.

10. A method as recited in claim 9, wherein prior to said filling an overcoat forming material, a surface of the end fitting member is subjected to a phosphate treatment.

11. The method according to claim 10, wherein a primer is applied to the end fitting member before said filling an overcoat forming material.

12. The method according to claim 9, wherein the packing member is formed by a material which does not affect the connection of curing performance of the overcoat forming material.

13. The method according to claim 9, wherein an inner shape of the end fitting member permits sliding of the packing member.

14. The method according to claim 9, wherein, in the case that the packing member is once set in the end fitting member, if the end portion of the core member is moved in a direction pulling up from the end fitting member, the packing member is not moved in a direction pulling up from the position set in the end fitting member.

15. The method according to claim 9, wherein the packing member has a V-shaped cross section.

16. The method according to claim 15, wherein the packing member has a V-shaped cross section which can be closely contacted to the end surface of the end fitting member and the outer surface of the core member near the end portion.

17. The method according to claim 9, wherein prior to said clamping each end fitting member to each end portion of said core member, an insulation polymer material is arranged near a boundary exposed to an external atmosphere between the end fitting member and the overcoat member and is cured to seal the boundary between the end fitting member and the overcoat member.

18. The method according to claim 9, wherein said end fitting members are arranged at both ends of the core member in such a manner that a gap exists between the end portion of the end fitting member and the end portion of the overcoat member, and prior to said clamping each end fitting member to each end portion of said core member, an insulation polymer material is arranged near a boundary exposed to an external atmosphere between the end fitting member and the overcoat member and is cured to seal the boundary between the end fitting member and the overcoat member.

19. The method according to claim 17, wherein the insulation polymer material is the same as that of the overcoat forming material which forms the overcoat member.

20. The method according to claim 17, wherein the insulation polymer material is formed using a metal mold other than that used for forming the overcoat member.

21. The method according to claim 9, wherein the overcoat member is formed by compression.

22. The method according to claim 9, wherein the end fitting member is introduced into a predetermined position in the mold by using a guide provided in the mold when the overcoat member is formed by compression.

* * * * *